(12) United States Patent
Ji et al.

(10) Patent No.: US 10,887,094 B2
(45) Date of Patent: Jan. 5, 2021

(54) AUTHENTICATION APPARATUS AND METHOD FOR QUANTUM CRYPTOGRAPHY COMMUNICATION

(71) Applicant: ELECTRONICS AND TELECOMMUNICATIONS RESEARCH INSTITUTE, Daejeon (KR)

(72) Inventors: Se Wan Ji, Seoul (KR); Changho Hong, Seoul (KR); Younchang Jeong, Daejeon (KR); Osung Kwon, Daejeon (KR); Haeng-Seok Ko, Daejeon (KR); Jingak Jang, Daejeon (KR); Daesung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 311 days.

(21) Appl. No.: 16/041,994

(22) Filed: Jul. 23, 2018

(65) Prior Publication Data
US 2019/0238326 A1 Aug. 1, 2019

(30) Foreign Application Priority Data
Jan. 29, 2018 (KR) .................. 10-2018-0010904

(51) Int. Cl.
*H04L 9/08* (2006.01)
(52) U.S. Cl.
CPC .......... *H04L 9/0858* (2013.01); *H04L 9/0819* (2013.01); *H04L 9/0861* (2013.01)

(58) Field of Classification Search
CPC .... H04L 9/0858; H04L 9/0819; H04L 9/0861
See application file for complete search history.

(56) References Cited

U.S. PATENT DOCUMENTS

| 8,171,354 B2 | 5/2012 | Tanaka et al. | |
| 8,639,927 B2 * | 1/2014 | Choi | H04L 9/0852 713/168 |

(Continued)

FOREIGN PATENT DOCUMENTS

| JP | 2007-020011 A | 1/2007 |
| KR | 10-2011-0057448 A | 6/2011 |

(Continued)

*Primary Examiner* — Joseph P Hirl
*Assistant Examiner* — Stephen T Gundry
(74) *Attorney, Agent, or Firm* — LRK Patent Law Firm

(57) ABSTRACT

An authentication apparatus and method for quantum cryptography communication. The quantum cryptography communication authentication method is performed using quantum cryptography communication authentication apparatuses, and includes transmitting, by a first quantum cryptography communication authentication apparatus, a quantum state to a second quantum cryptography communication authentication apparatus by selecting a first basis, and measuring, by the second quantum cryptography communication authentication apparatus, the quantum state by selecting a second basis, and performing, by the first quantum cryptography communication authentication apparatus and the second quantum cryptography communication authentication apparatus, authentication by revealing the first basis and the second basis and by comparing sifted keys generated from a common basis between the first basis and the second basis with each other.

20 Claims, 5 Drawing Sheets

(56) References Cited

U.S. PATENT DOCUMENTS

| | | | |
|---|---|---|---|
| 10,038,554 B2* | 7/2018 | Fu | H04L 9/0852 |
| 10,313,114 B2* | 6/2019 | Fu | H04L 63/061 |
| 10,389,525 B2 | 8/2019 | Fu et al. | |
| 2015/0193306 A1* | 7/2015 | Doi | G06F 11/1402 |
| | | | 714/746 |
| 2015/0215122 A1 | 7/2015 | Takahashi et al. | |
| 2016/0218868 A1* | 7/2016 | Takahashi | H04L 9/0858 |
| 2016/0241396 A1* | 8/2016 | Fu | H04L 9/0852 |
| 2017/0033926 A1* | 2/2017 | Fu | H04L 9/0858 |
| 2017/0126654 A1* | 5/2017 | Fu | H04L 63/0435 |
| 2017/0264433 A1* | 9/2017 | Tanizawa | H04L 63/061 |
| 2017/0324552 A1* | 11/2017 | Ahn | H04L 9/0872 |
| 2017/0338951 A1* | 11/2017 | Fu | H04L 9/0852 |
| 2017/0338952 A1* | 11/2017 | Hong | H04L 9/0858 |
| 2017/0346627 A1* | 11/2017 | Alleaume | H04L 9/0844 |
| 2018/0048466 A1* | 2/2018 | Chen | H04L 9/32 |
| 2018/0109372 A1* | 4/2018 | Fu | H04L 9/083 |
| 2019/0123896 A1* | 4/2019 | Hong | H04L 9/3228 |
| 2019/0149327 A1* | 5/2019 | Yuan | H04L 9/0855 |
| | | | 380/255 |
| 2019/0305942 A1* | 10/2019 | Cambou | H04L 63/0485 |
| 2019/0327095 A1* | 10/2019 | Hong | H04L 9/0852 |
| 2019/0379536 A1* | 12/2019 | Han | H04L 9/3226 |
| 2020/0052898 A1* | 2/2020 | Wentz | H04L 9/3239 |
| 2020/0127821 A1* | 4/2020 | Dolev | H04L 63/0823 |
| 2020/0153619 A1* | 5/2020 | Ribordy | H04L 9/0852 |
| 2020/0153627 A1* | 5/2020 | Wentz | G06F 21/6218 |

FOREIGN PATENT DOCUMENTS

| | | |
|---|---|---|
| KR | 10-1659912 B1 | 9/2016 |
| KR | 10-2017-0078728 A | 7/2017 |

* cited by examiner

AUTHENTICATION APPARATUS AND METHOD FOR QUANTUM CRYPTOGRAPHY COMMUNICATION

CROSS REFERENCE TO RELATED APPLICATION

This application claims the benefit of Korean Patent Application No. 10-2018-0010904, filed Jan. 29, 2018, which is hereby incorporated by reference in its entirety into this application.

BACKGROUND OF THE INVENTION

1. Technical Field

The present invention relates generally to quantum cryptography communication technology and, more particularly, to authentication and communication technology in a quantum communication protocol.

2. Description of Related Art

Quantum cryptography communication can provide an encryption technique based on quantum physics instead of an encryption technique in existing modern cryptography communication based on mathematical security.

That is, quantum cryptography communication can ensure information-theoretic security rather than security based on non-computability (i.e. computational security), as communication security.

Quantum key distribution, which is a kind of quantum cryptography communication, may generate an encryption private key (quantum key) using a quantum as a medium, without requiring any previously shared information.

A BB84 protocol, which is the most well-known quantum key distribution scheme, may randomly select two types of basis pairs, which are different from each other and have an overlap there between, so as to generate a quantum key.

Here, the BB84 protocol may encode and transmit random numbers 0 and 1 for each basis, may measure quantum states using one of the bases, may discard pieces of information selected in the different bases, and may use only pieces of information selected in the same basis as quantum key candidates.

Quantum key distribution may randomly select a large amount of information (typically, about half) from among quantum key candidates selected through the above procedure.

Here, quantum key distribution may reveal the selected quantum key candidates and check an error rate occurring in a legitimate communication process, thus primarily determining whether an eavesdropper is present.

Further, as actual communication errors start to be reflected, quantum key distribution may need a postprocessing procedure, and may include an error correction procedure for recovering communication errors and a privacy amplification procedure.

A universal hash may be applied to the above procedures, and may include even an authentication procedure by applying a private key, which is shared in common with the partner of quantum cryptography communication, to a communication process.

In existing quantum cryptography communication, the entire protocol process including transmission, measurement, error correction, and privacy amplification is terminated, and thereafter cryptographic communication is performed using a generated encryption key.

Here, the existing quantum cryptography communication can undergo a communication procedure for revealing whether the corresponding user has a legitimate authentication private key during cryptographic communication.

That is, in existing quantum cryptography communication, authentication of an entity is performed only after the entire process ranging from the transmission of quanta to privacy amplification has been terminated. Accordingly, if there is an attacker who launches a man-in-the-middle attack that is suitable both for a quantum channel and for a classical channel, a problem may arise in that it is impossible to identify the existence of the attacker until the generation of the most quantum keys is completed.

In this case, the existing quantum cryptography communication has a problem in that authentication or non-authentication is verified after the exchange of a large amount of unnecessary information has been conducted when a protocol is executed.

Meanwhile, in existing modern cryptographic communication, authentication schemes for verifying appropriateness for a communication partner, which is the basis of all cryptographic communication, are classified into a private key-based authentication scheme which uses previously shared private keys, and a public key-based authentication scheme which uses a pair of a public key and a private key having a mathematical relation therebetween.

The two schemes may authenticate communication partners by verifying the validity of each partner using secret (private) information uniquely and previously possessed by communicating entities.

Here, authentication technology in existing quantum cryptography communication essentially requires a previously defined and shared key (i.e. authentication key).

Further, authentication technology in the existing quantum cryptography communication may correct errors and then authenticate communication entities by applying a previously shared authentication key to a privacy amplification procedure only when a quantum noise state for verifying non-existence of eavesdropping is checked after a transfer procedure such as the transmission and measurement of quanta has been terminated.

In this case, the actual speed of quantum key distribution is affected most by a complicated error correction procedure in the postprocessing procedure rather than by a quantum state transfer/measurement procedure.

Furthermore, in authentication technology in the existing quantum cryptography communication, there is a method by which a sender and a receiver desired to be authenticated perform mutual authentication by checking a previously shared authentication sequence. However, this method makes it impossible to perform authentication for procedures other than the procedure for checking an authentication sequence.

Therefore, the existing quantum cryptography communication requires technology for distributing and sharing quanta required for authentication of a communication partner, which is essential for secure communication, and for immediately checking whether a legitimate communication entity has received quanta while minimizing the exchange of unnecessary information.

That is, authentication technology in the existing quantum cryptography communication uses a method in which, when a previously shared authentication key is present, the location of a quantum associated with the previously shared authentication key is designated and revealed when an error rate is checked after the execution of an existing quantum key distribution protocol, and in which the error rate of revealed information is checked, thus enabling mutual authentication to be performed.

However, authentication technology in existing quantum cryptography communication is problematic in that it requires a process for analyzing and verifying a basis, which is mutually shared between communication entities to reveal authentication information, and resulting information, and in that a computational load is imposed by information analysis.

In addition, authentication technology in quantum cryptography communication using quantum entanglement may issue a quantum certificate using a mediator.

However, the concept of the term "quantum certificate" is vague and is insubstantial, and the presence of a malicious mediator must be taken into consideration due to the authority of a mediator when the mediator intervenes in communication.

Meanwhile, as related technology, there is Korean Patent Application Publication No. 10-2011-0057448 entitled "Method of User-authenticated Quantum Key Distribution". This technology discloses a quantum key distribution method for user authentication, which authenticates a quantum channel by sharing a location having the same basis using a previously shared private key without revealing basis information and by determining whether users have the same measurement value for that location, in order to guarantee unconditional security of a BB84 quantum key distribution (QKD) protocol vulnerable to man-in-the-middle attacks.

SUMMARY OF THE INVENTION

Accordingly, the present invention has been made keeping in mind the above problems occurring in the prior art, and an object of the present invention is to authenticate a communication partner and guarantee continuous certification for an authenticated key stream in order to implement secure quantum cryptography communication.

Another object of the present invention is to provide secure communication between legitimate users by integrating entity authentication with a quantum direct communication technique.

In accordance with an aspect of the present invention to accomplish the above objects, there is provided an authentication method for quantum cryptography communication, the authentication method being performed using quantum cryptography communication authentication apparatuses, the authentication method including transmitting, by a first quantum cryptography communication authentication apparatus, a quantum state to a second quantum cryptography communication authentication apparatus by selecting a first basis, and measuring, by the second quantum cryptography communication authentication apparatus, the quantum state by selecting a second basis, and performing, by the first quantum cryptography communication authentication apparatus and the second quantum cryptography communication authentication apparatus, authentication by revealing the first basis and the second basis and by comparing sifted keys generated from a common basis between the first basis and the second basis with each other.

The authentication method may further include generating quantum keys by correcting errors in authenticated sifted keys and by amplifying privacy.

Performing authentication may be configured such that the first quantum cryptography communication authentication apparatus and the second quantum cryptography communication authentication apparatus generate the sifted keys by selecting results in the common basis.

Performing authentication may be configured to generate sifted keys, each including authentication bits corresponding to function classification values for authenticating the corresponding sifted key.

Performing authentication may be configured to divide the function classification values of bits included in the sifted key into signal bits, Quantum Bit Error Rate (QBER) bits, and authentication bits.

Performing authentication may be configured such that the first quantum cryptography communication authentication apparatus indicates a sequence of the function classification values for the signal bits, the QBER bits, and the authentication bits included in the sifted key, and then shares the sifted key with the second quantum cryptography communication authentication apparatus.

Performing authentication may be configured to reveal the QBER bits without change and to invert and reveal result values for the authentication bits depending on a basis of values of the authentication bits.

Performing authentication may be configured such that the first quantum cryptography communication authentication apparatus and the second quantum cryptography communication authentication apparatus perform authentication by comparing the QBER bits and the authentication bits shared therebetween.

Performing authentication may be configured to compare the QBER bits without change and to invert and compare result values for the authentication bits depending on the basis of the values of the authentication bits.

Performing authentication may be configured such that the first quantum cryptography communication authentication apparatus performs authentication by comparing result values for the authentication bits before being inverted with inverted values of result values for authentication bits revealed by the second quantum cryptography communication authentication apparatus.

In accordance with another aspect of the present invention to accomplish the above objects, there is provided an authentication apparatus for quantum cryptography communication, including a quantum state communication unit for, when a quantum state is transmitted, selecting a first basis and then transmitting the quantum state, and when a quantum state is received, selecting a second basis and then measuring the received quantum state, and a bit authentication unit for revealing any one of the first basis and the second basis, and performing authentication by comparing sifted keys generated from a common basis between the revealed basis and a third basis revealed by an additional quantum cryptography communication authentication apparatus.

The authentication apparatus may further include a post-processing unit for correcting error in an authenticated sifted key, and a quantum key generation unit for generating a quantum key by amplifying privacy of the authenticated sifted key.

The bit authentication unit may generate the sifted key by selecting results in the common basis.

The bit authentication unit may generate the sifted key including authentication bits corresponding to function classification values for authenticating the sifted key.

The bit authentication unit may divide the function classification values of bits included in the sifted key into signal bits, Quantum Bit Error Rate (QBER) bits, and authentication bits.

The bit authentication unit may indicate a sequence of the function classification values for the signal bits, the QBER bits, and the authentication bits included in the sifted key, and then share the sifted key with the additional quantum cryptography communication authentication apparatus.

The bit authentication unit may be configured to reveal the QBER bits without change and to invert and reveal result values for the authentication bits depending on a basis of values of the authentication bits.

The bit authentication unit may perform authentication by comparing the QBER bits and the authentication bits shared with the additional quantum cryptography communication authentication apparatus.

The bit authentication unit may be configured to compare the QBER bits without change and to invert and compare result values for the authentication bits depending on the basis of the values of the authentication bits.

The bit authentication unit may perform authentication by comparing result values for the authentication bits, before being inverted, with inverted values of result values for authentication bits revealed by the additional quantum cryptography communication authentication apparatus.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
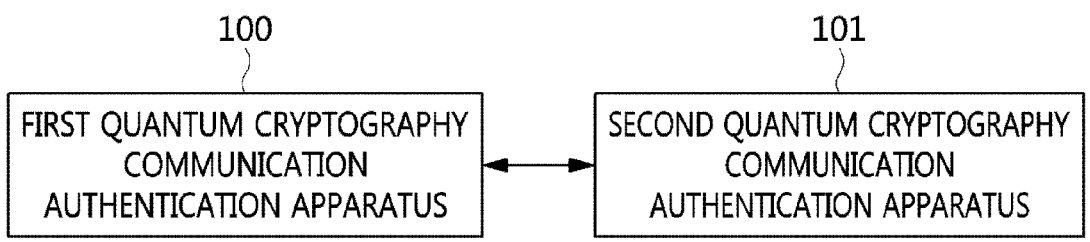
FIG. 1 is a block diagram illustrating a quantum cryptography communication environment according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, embodiments of the present invention will be described in detail with reference to the attached drawings.

FIG. 1 is a block diagram illustrating a quantum cryptography communication environment according to an embodiment of the present invention.

Referring to FIG. 1, in the quantum cryptography communication environment according to the embodiment of the present invention, a first authentication apparatus 100 for quantum cryptography communication (hereinafter referred to as a "first quantum cryptography communication authentication apparatus 100") and a second authentication apparatus 101 for quantum cryptography communication (hereinafter referred to as a "second quantum cryptography communication authentication apparatus 101") may perform quantum cryptography communication.

Here, the first quantum cryptography communication authentication apparatus 100 may be 'Alice', who is a message sender, and the second quantum cryptography communication authentication apparatus 101 may be 'Bob', who is a message receiver.

Information used for quantum cryptography communication according to an embodiment of the present invention and a quantum basis used for encoding may be defined as follows.

Quantum state transfer bases initially predefined by Alice and Bob may be represented by $\{+\}$ and $\{\times\}$.

Here, in the case of quantum key distribution, the bases may be defined depending on actually utilized physical entities, such as polarization encoding or phase encoding.

In polarization encoding, bases may be defined as $[\{+\}=\{\rightarrow, \uparrow\}=\{0°, 90°\}, \{\times\}=\{\nearrow, \searrow\}=\{45°, 135°\}]$.

In phase decoding, bases may be defined as $[\{+\}=\{0°, 180°\}, \{\times\}=\{90°, 270°\}]$.

Also, quantum states used in quantum cryptography communication according to the embodiment of the present invention may be defined as follows.

Initially, quantum states transmitted from Bob to Alice may be defined as $|ini\rangle_i = \{|0\rangle, |+\rangle, |-\rangle\}$, $\{+\}=\{|0\rangle, |1\rangle\}$, and $\{\times\}=\{|+\rangle, |-\rangle\}$.

When $|ini\rangle_i$ is represented by a matrix, it may be represented by $$|0\rangle = \begin{pmatrix} 1 \\ 0 \end{pmatrix}, |1\rangle = \begin{pmatrix} 0 \\ 1 \end{pmatrix}, |+\rangle = \begin{pmatrix} 1 \\ 1 \end{pmatrix}, \text{ and } |-\rangle = \begin{pmatrix} 1 \\ -1 \end{pmatrix}.$$

Here, a z basis may be represented by $\{|0\rangle, |1\rangle\}$, and an x basis may be represented by $\{|+\rangle, |-\rangle\}$.

Further, relationships between quantum states may be represented by $$|+\rangle = \frac{1}{\sqrt{2}}(|0\rangle + |1\rangle) \text{ and } |-\rangle = \frac{1}{\sqrt{2}}(|0\rangle - |1\rangle).$$

Here, two users may have a previously shared authentication key $Ak=(Ak_1, Ak_2, \ldots, Ak_n)$, by which the two users can be mutually authenticated.

Alice may designate a quantum state for authentication, and may reveal a measurement result at a designated location such that, when the value of the authentication key $Ak_i$ is 0, a result value in the basis $\{+\}$ is inverted and revealed, and when the value of the authentication key $Ak_i$ is 1, a result value in the basis {×} is inverted and revealed.

Quantum cryptography communication according to the embodiment of the present invention may use quantum channels through which quantum states are transmitted, in addition to classical channels.

In this case, quantum cryptography communication according to the embodiment of the present invention may verify the security of the quantum channels using the classical channels, and may perform authentication and message encryption/decryption based on signal information that is transmitted/received through the classical channels.

The authentication apparatus and method for quantum cryptography communication according to the embodiment of the present invention may determine whether quantum states transferred through quantum channels are eavesdropped upon while performing an authentication procedure.

Also, quantum cryptography communication according to the embodiment of the present invention may be used for all of protocolized schemes, such as quantum key distribution and quantum direct communication.

Here, in the quantum key distribution scheme according to an embodiment of the present invention, the first quantum cryptography communication authentication apparatus 100 and the second quantum cryptography communication authentication apparatus 101 may select two types of basis pairs, which are different from each other and have a mutual overlap therebetween, in order to generate quantum keys.

Here, when the first quantum cryptography communication authentication apparatus 100 randomly selects two bases and transmits a quantum in which 0 or 1 is encoded in each basis, the second quantum cryptography communication authentication apparatus 101 may generate a quantum key by performing a procedure for performing measurement in one of the two bases.

Figure 2:
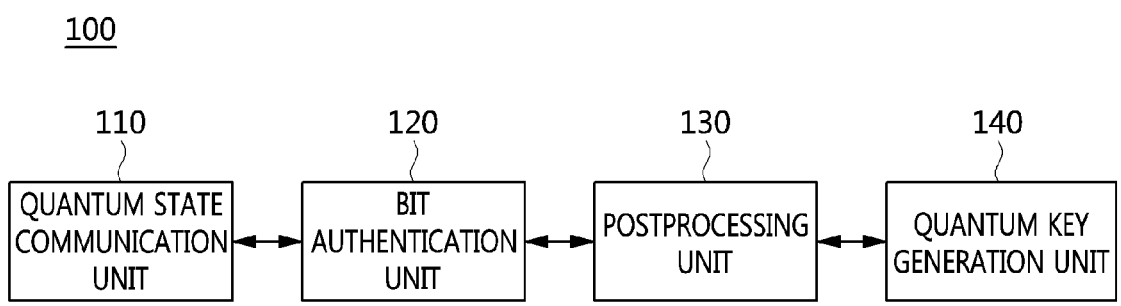
FIG. 2 is a block diagram illustrating an authentication apparatus for quantum cryptography communication according to an embodiment of the present invention.

FIG. 2 is a block diagram illustrating an authentication apparatus for quantum cryptography communication according to an embodiment of the present invention.

Referring to FIG. 2, the quantum cryptography communication authentication apparatus according to the embodiment of the present invention includes a quantum state communication unit 110, a bit authentication unit 120, a postprocessing unit 130, and a quantum key generation unit 140.

When transmitting a quantum state, the quantum state communication unit 110 may transmit the quantum state by selecting a first basis, whereas when receiving a quantum state, the quantum state communication unit 110 may measure the received quantum state by selecting a second basis.

Here, the quantum state communication unit 110 may transmit a quantum state generated by randomly selecting a basis and an encoding scheme.

The quantum state communication unit 110 may perform optical transmission having polarization states (e.g. →, ↘, ↑, →, ↗, ↗, →, →, ↘, ↑, →, ↗, ↗, →).

Further, the quantum state communication unit 110 may have in advance a previously shared authentication key $Ak=(Ak_1, Ak_2, \ldots, Ak_n)$, which allows the quantum cryptography communication authentication apparatus and an additional quantum cryptography communication authentication apparatus to mutually authenticate each other.

The bit authentication unit 120 may reveal any one of the first basis and the second basis, and may then perform authentication by comparing sifted keys generated from a common basis between the revealed one basis and a third basis revealed by the additional quantum cryptography communication authentication apparatus.

The bit authentication unit 120 may select results in the common basis, and may then generate a sifted key.

The bit authentication unit 120 may generate a sifted key including authentication bits corresponding to function classification values for authenticating the sifted key.

Here, the bit authentication unit 120 may divide the function classification values of bits included in the sifted key into signal bits, Quantum Bit Error Rate (QBER) bits, and authentication bits.

The bit authentication unit 120 may indicate the sequence of the function classification values, such as the signal bits, the QBER bits, and the authentication bits included in the sifted key, and then share the function classification values with the additional quantum cryptography communication authentication apparatus.

In this case, when selecting the signal bits, the QBER bits, or the authentication bits, the bit authentication unit 120 may identify and select the QBER bits in the form of {QBER bits, authentication bits}.

When an authentication error attributable to authentication bits occurs, without influencing the efficiency of quantum key distribution and influencing QBER bits, the bit authentication unit 120 may simultaneously perform authentication and eavesdropping checking because the authentication error influences the increase in QBER.

Also, when selecting signal bits, QBER bits, and authentication bits, the bit authentication unit 120 may use all of the QBER bits as the authentication bits, and may simultaneously perform authentication and eavesdropping checking without influencing the efficiency of quantum key distribution and the values of the QBER bits.

Here, when all of the QBER bits are used as authentication bits, measurement values converted by the authentication bits are revealed and the values of the authentication bits themselves are not revealed even if the size of the authentication bits is limited. As a result, the authentication unit 120 may use the QBER bits by continuously and repeatedly rotating the authentication bits themselves or by applying values extended by an algorithm, such as a Linear Feedback Shift Register (LFSR), to the values of authentication bits. Accordingly, authentication and eavesdropping checking may be simultaneously performed without influencing the efficiency of quantum key distribution and the values of QBER bits.

Here, the bit authentication unit 120 may reveal the QBER bits without change, and may invert and reveal result values for the authentication bits depending on the basis of the values of the authentication bits.

For example, when the value of the previously shared authentication key is $Ak_i=0$, the bit authentication unit 120 may invert and reveal a result value in the basis {+} (i.e. 0⇒1, 1⇒0).

Further, when the value of the previously shared authentication key is $Ak_i=1$, the bit authentication unit 120 may invert and reveal a result value in the basis {×} (i.e. 0⇒1, 1⇒0).

That is, the bit authentication unit 120 may designate a quantum state for authentication, and may reveal a measurement result at a designated location such that, when the value of the authentication key $Ak_i$ is 0, a result value in the basis {+} is inverted and revealed, and when the value of the authentication key $Ak_i$ is 1, a result value in the basis {×} is inverted and revealed.

Here, the bit authentication unit 120 may perform authentication by comparing QBER bits and authentication bits that are shared with the additional quantum cryptography communication authentication apparatus.

Here, when authentication is performed, the bit authentication unit 120 may perform authentication by regarding all of the QBER bits as authentication bits and identifying the comparison of the authentication bits with the comparison of the QBER bits.

The bit authentication unit 120 may compare QBER bits without change, and may invert and compare result values for the authentication bits depending on the basis of the bits of the authentication bits.

Here, the bit authentication unit 120 may perform authentication by comparing result values for the authentication bits, before being inverted, with inverted values of the result values for authentication bits revealed by the additional quantum cryptography communication authentication apparatus.

For example, when the value of the previously shared authentication key is $Ak_i=0$, the bit authentication unit 120 may invert and compare a result value in the basis {+} (i.e. 0⇒1, 1⇒0).

Further, when the value of the previously shared authentication key is $Ak_i=1$, the bit authentication unit 120 may invert and compare a result value in the basis {×} (i.e. 0⇒1, 1⇒0).

The bit authentication unit 120 may check the QBER bits and the authentication bits either separately or simultaneously depending on the strength of authentication.

The bit authentication unit 120 may check the range of guarantee of security by individually comparing authentication bits and by utilizing integrated values of the QBER bits and the authentication bits.

That is, the bit authentication unit 120 may prevent users who do not possess previously shared legitimate authentication keys from being aware of the time when normal values are to be provided or when inverted values are to be provided by revealing inverted values or normal result values based on predefined rules.

Therefore, the bit authentication unit 120 may increase an error rate when comparing revealed values, and may simultaneously perform authentication and QBER checking.

The postprocessing unit 130 may correct errors in the authenticated sifted key.

The quantum key generation unit 140 may generate a quantum key by amplifying the privacy of the authenticated sifted key.

Here, the quantum key generation unit 140 may perform authentication and generate a new authentication key and a new encryption key by using the previously shared authentication key.

Figure 3:
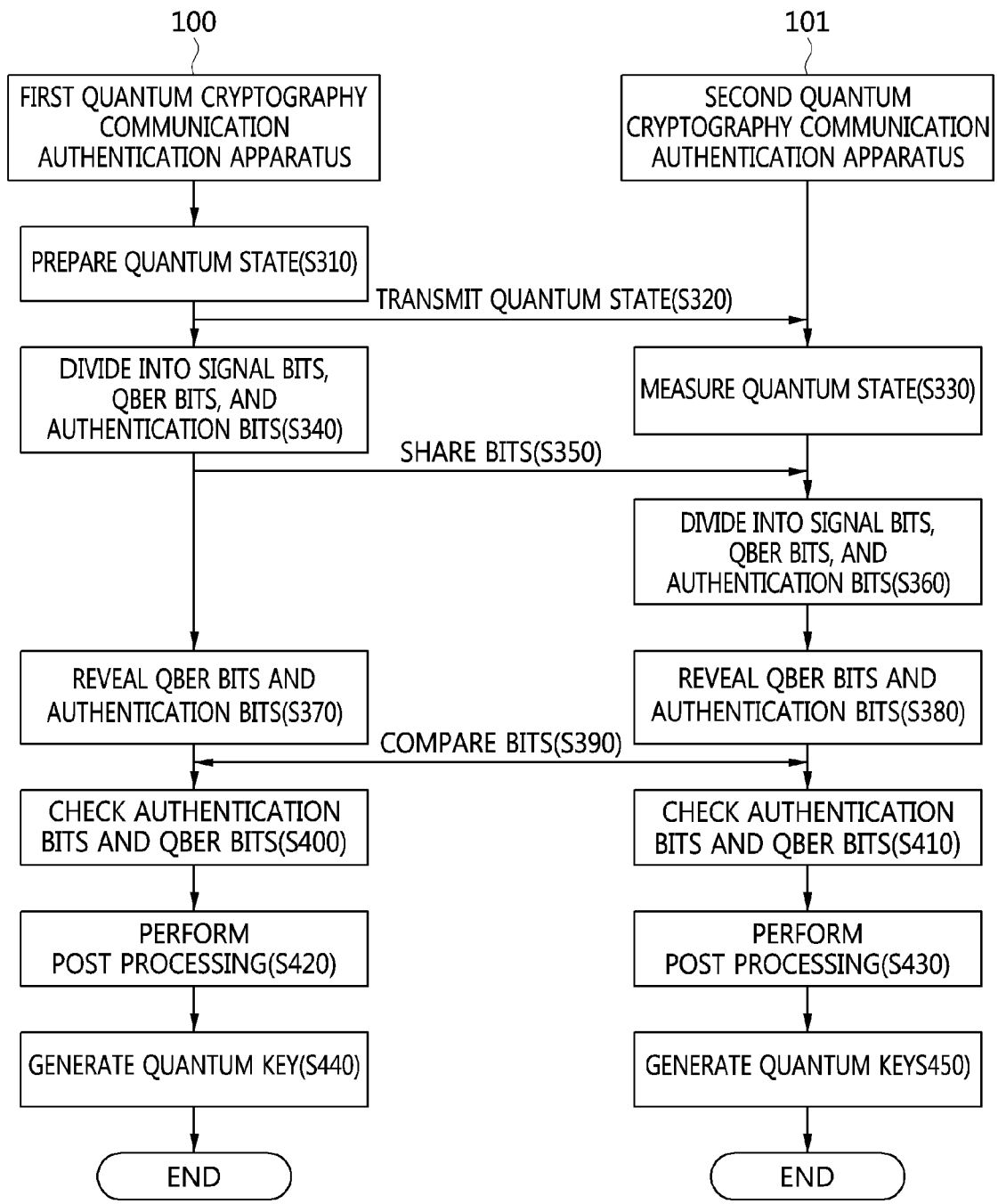
FIG. 3 is a sequence diagram illustrating an authentication method for quantum cryptography communication in a quantum cryptography communication environment according to an embodiment of the present invention.

FIG. 3 is a sequence diagram illustrating an authentication method for quantum cryptography communication in a quantum cryptography communication environment according to an embodiment of the present invention.

Referring to FIG. 3, the quantum cryptography communication authentication method in the quantum cryptography communication environment according to the embodiment of the present invention may primarily prepare a quantum state at step S310.

That is, at step S310, the first quantum cryptography communication authentication apparatus 100 may first prepare the quantum state.

At step S310, the first quantum cryptography communication authentication apparatus 100 may randomly select a first basis and an encoding scheme.

At step S310, the first quantum cryptography communication authentication apparatus 100 and the second quantum cryptography communication authentication apparatus 101 may have a previously shared authentication key $Ak=(Ak_1, Ak_2, \ldots, Ak_n)$ enabling them to authenticate each other.

Next, the quantum cryptography communication authentication method according to the embodiment of the present invention may transmit the quantum state at step S320.

That is, at step S320, the first quantum cryptography communication authentication apparatus 100 may transmit the quantum state that uses the randomly selected first basis to the second quantum cryptography communication authentication apparatus 101.

At step S320, the first quantum cryptography communication authentication apparatus 100 may perform optical transmission having polarization states (e.g. →, ↘, ↑, →, ↗, ↗, →, →, ↘, ↑, →, ↗, ↗, and →).

Next, the quantum cryptography communication authentication method according to the embodiment of the present invention may measure the quantum state at step S330.

That is, at step S330, the second quantum cryptography communication authentication apparatus 101 may measure the quantum state received from the first quantum cryptography communication authentication apparatus 100 using a second basis randomly selected by the second quantum cryptography communication authentication apparatus 101.

Next, in the quantum cryptography communication authentication method according to the embodiment of the present invention, the first quantum cryptography communication authentication apparatus 100 may classify bits at step S340.

That is, at step S340, the function classification values of bits included in a sifted key may be divided into signal bits, Quantum Bit Error Rate (QBER) bits, and authentication bits.

Here, at step S340, a sifted key which includes authentication bits corresponding to function classification values for authenticating the sifted key may be generated.

At step S340, when signal bits, QBER bits, and authentication bits are selected, the QBER bits may be identified and selected in the form of {QBER bits, authentication bits}.

At step S340, when an authentication error attributable to authentication bits occurs, without influencing the efficiency of quantum key distribution and influencing QBER bits, authentication and eavesdropping checking may be simultaneously performed because the authentication error influences the increase in QBER.

Further, at step S340, when signal bits, QBER bits, and authentication bits are selected, all of the QBER bits may be used as the authentication bits, and authentication and eavesdropping checking may be simultaneously performed without influencing the efficiency of quantum key distribution and the values of the QBER bits.

Here, at step S340, when all of the QBER bits are used as authentication bits, measurement values converted by the authentication bits are revealed and the values of the authentication bits themselves are not revealed even if the size of the authentication bits is limited. As a result, step S340 may be configured to use the QBER bits by continuously and repeatedly rotating the authentication bits themselves or by applying values extended by an algorithm, such as a Linear Feedback Shift Register (LFSR), to the values of authentication bits. Accordingly, authentication and eavesdropping checking may be simultaneously performed without influencing the efficiency of quantum key distribution and the values of QBER bits.

Next, in the quantum cryptography communication authentication method according to the embodiment of the present invention, the first quantum cryptography communication authentication apparatus 100 may share bits at step S350.

In detail, at step S350, the first quantum cryptography communication authentication apparatus 100 may indicate the sequence of the function classification values, such as the signal bits, the QBER bits, and the authentication bits included in the sifted key, and may then share the bits with the second quantum cryptography communication authentication apparatus 101.

Further, in the quantum cryptography communication authentication method according to the embodiment of the present invention, the second quantum cryptography communication authentication apparatus 101 may classify bits at step S360.

That is, at step S360, the function classification values of bits included in a sifted key may be divided into signal bits, QBER bits, and authentication bits.

Here, at step S360, a sifted key which includes authentication bits corresponding to the function classification values for authenticating the sifted key may be generated.

Here, at step S360, the first quantum cryptography communication authentication apparatus 100 and the second quantum cryptography communication authentication apparatus 101 may select results in a common basis, and may then generate the sifted keys.

Next, in the quantum cryptography communication authentication method according to the embodiment of the present invention, the first quantum cryptography communication authentication apparatus 100 and the second quantum cryptography communication authentication apparatus 101 may reveal bits at steps S370 and S380.

That is, at steps S370 and S380, the first quantum cryptography communication authentication apparatus 100 and the second quantum cryptography communication authentication apparatus 101 may reveal the QBER bits and the authentication bits.

At steps S370 and S380, the QBER bits may be revealed without change, and result values for the authentication bits may be inverted and revealed depending on the basis of the values of the authentication bits.

For example, at steps S370 and S380, when the value of the previously shared authentication key is $Ak_i=0$, a result value in the basis $\{+\}$ (i.e. $0\Rightarrow1$, $1\Rightarrow0$) may be inverted and revealed.

Further, at steps S370 and S380, when the value of the previously shared authentication key is $Ak_i=1$, a result value in the basis $\{\times\}$ (i.e. $0\Rightarrow1$, $1\Rightarrow0$) may be inverted and revealed.

That is, steps S370 and S380 may be configured to designate a quantum state for authentication, and reveal a measurement result at a designated location such that, when the value of the authentication key $Ak_i$ is 0, a result value in the basis $\{+\}$ is inverted and revealed, and when the value of the authentication key $Ak_i$ is 1, a result value in the basis $\{\times\}$ is inverted and revealed.

Further, in the quantum cryptography communication authentication method according to the embodiment of the present invention, the first quantum cryptography communication authentication apparatus 100 and the second quantum cryptography communication authentication apparatus 101 may compare bits with each other at step S390.

That is, at step S390, the QBER bits and the authentication bits, which are revealed by the first quantum cryptography communication authentication apparatus 100 and by the second quantum cryptography communication authentication apparatus 101, may be respectively compared to perform authentication.

Here, at step S390, authentication may be performed by regarding all of the QBER bits as authentication bits and by identifying the comparison of the authentication bits with the comparison of the QBER bits.

In this case, step S390 may be performed such that the QBER bits are compared without change, and result values for the authentication bits may be inverted and compared depending on the basis of the values of the authentication bits.

Next, in the quantum cryptography communication authentication method according to the embodiment of the present invention, the first quantum cryptography communication authentication apparatus 100 and the second quantum cryptography communication authentication apparatus 101 may perform authentication at steps S400 and S410.

In detail, at steps S400 and S410, the first quantum cryptography communication authentication apparatus 100 and the second quantum cryptography communication authentication apparatus 101 may check the authentication bits and the QBER bits.

Here, at steps S400 and S410, authentication may be performed by comparing result values for the authentication bits, before being inverted, with inverted values of the result values for authentication bits revealed by the additional quantum cryptography communication authentication apparatus.

For example, at steps S400 and S410, when the value of the previously shared authentication key is $Ak_i=0$, a result value in the basis $\{+\}$ (i.e. $0\Rightarrow1$, $1\Rightarrow0$) may be inverted and compared.

Further, at steps S400 and S410, when the value of the previously shared authentication key is $Ak_i=1$, a result value in the basis $\{\times\}$ (i.e. $0\Rightarrow1$, $1\Rightarrow0$) may be inverted and compared.

At steps S400 and S410, the QBER bits and the authentication bits may be checked either separately or simultaneously depending on the strength of authentication.

At steps S400 and S410, the range of guarantee of security may be checked by individually comparing authentication bits and by utilizing integrated values of the QBER bits and the authentication bits.

That is, at steps S400 and S410, users who do not possess previously shared legitimate authentication keys may be prevented from being aware of the time when normal values are to be provided or when inverted values are to be provided by revealing inverted values or normal result values based on predefined rules.

Therefore, at steps S400 and S410, an error rate may be increased upon comparing revealed values, and authentication and QBER checking may be simultaneously performed.

Next, in the quantum cryptography communication authentication method according to the embodiment of the present invention, the first quantum cryptography communication authentication apparatus 100 and the second quantum cryptography communication authentication apparatus 101 may perform postprocessing at steps S420 and S430.

That is, at steps S420 and S430, the first quantum cryptography communication authentication apparatus 100 and the second quantum cryptography communication authentication apparatus 101 may correct errors in the authenticated sifted keys.

Thereafter, in the quantum cryptography communication authentication method according to the embodiment of the present invention, the first quantum cryptography communication authentication apparatus 100 and the second quantum cryptography communication authentication apparatus 101 may generate quantum keys, respectively, at steps S440 and S450.

In detail, at steps S440 and S450, the first quantum cryptography communication authentication apparatus 100 and the second quantum cryptography communication authentication apparatus 101 may generate quantum keys by amplifying the privacy of the authenticated sifted keys, respectively.

Here, at steps S440 and S450, authentication keys, new authentication keys, and encryption keys may be generated using the previously shared authentication key.

Figure 4:
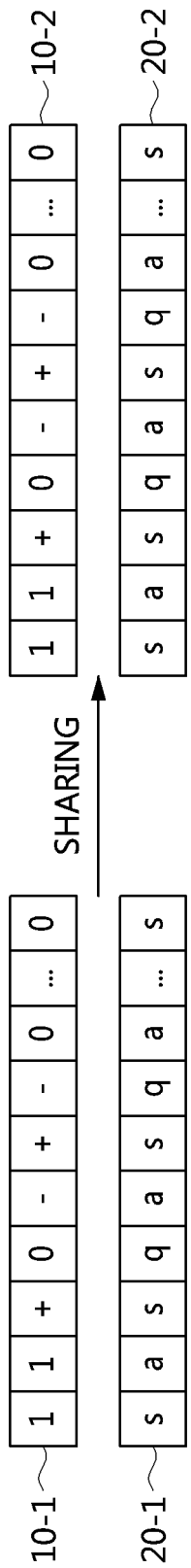
FIG. 4 is a diagram illustrating the sharing of a sifted key according to an embodiment of the present invention.

FIG. 4 is a diagram illustrating the sharing of a sifted key according to an embodiment of the present invention.

Referring to FIG. 4, it can be seen that the sharing of the sifted key according to the embodiment of the present invention means that the quantum cryptography communication authentication apparatus indicates the classification and sequence of functions in bits included in the sifted key, and then shares the sifted key with an additional quantum cryptography communication authentication apparatus.

That is, the first quantum cryptography communication authentication apparatus 100 may generate a sifted key 10-1 and indicate function classification values 20-1 in the sifted key 10-1.

Here, it can be seen that, in the function classification values 20-1, signal bits are indicated by 's', QBER bits are indicated by 'q', and authentication bits are indicated by 'a'.

The first quantum cryptography communication authentication apparatus 100 may share the sifted key 10-1 with the second quantum cryptography communication authentication apparatus 101.

The second quantum cryptography communication authentication apparatus 101 is allowed to share a sifted key 10-2 with the first quantum cryptography communication authentication apparatus 100.

In this case, it can be seen that function classification values 20-2 in the sifted key 10-2 of the second quantum cryptography communication authentication apparatus 101 are identical to the function classification values 20-1 in the sifted key 10-1 of the first quantum cryptography communication authentication apparatus 100.

Figure 5:
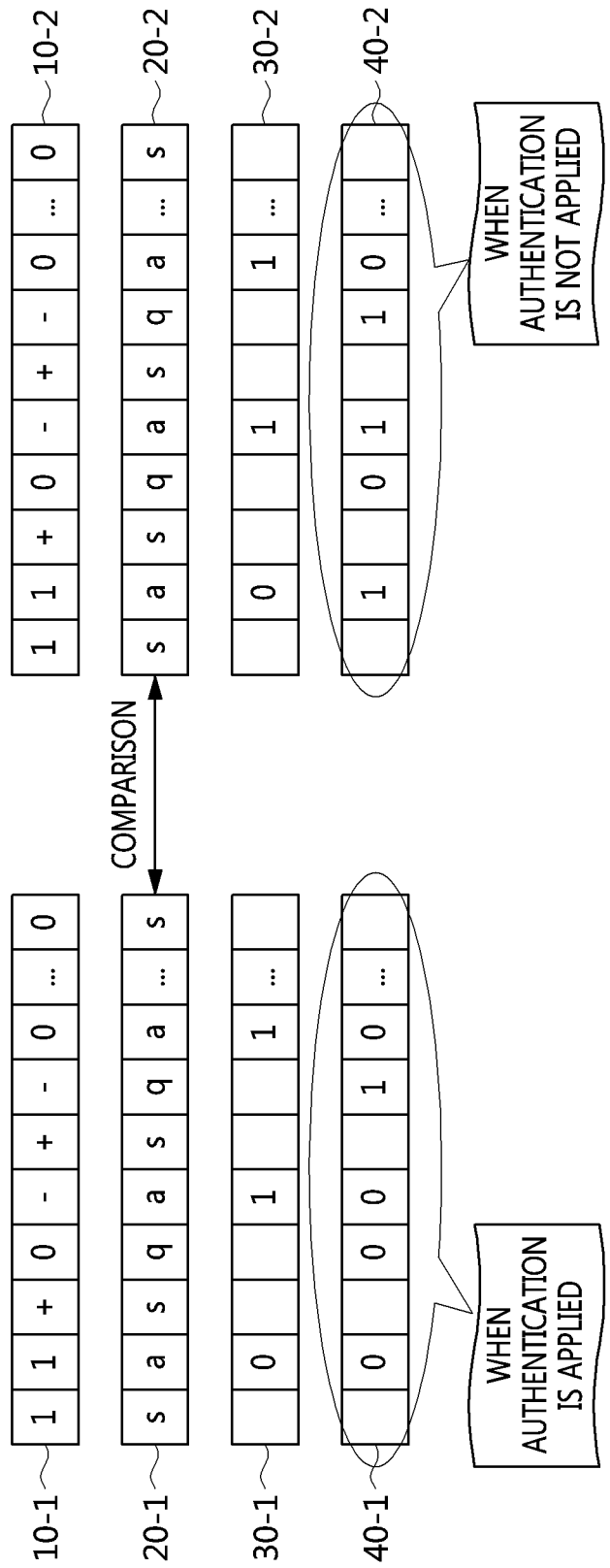
FIG. 5 is a diagram illustrating the authentication of a sifted key according to an embodiment of the present invention.

FIG. 5 is a diagram illustrating the results of authentication of a sifted key according to an embodiment of the present invention.

Referring to FIG. 5, it can be seen that, as the results of authentication of the sifted key according to the embodiment of the present invention, revealed result values, which are obtained when authentication has been applied, and revealed result values, which are obtained when authentication is not applied, are depicted.

That is, the first quantum cryptography communication authentication apparatus 100 and the second quantum cryptography communication authentication apparatus 101 have the same previously shared authentication keys 30-1 and 30-2.

Here, when authentication is applied, the first quantum cryptography communication authentication apparatus 100 reveals '0' in a result value 40-1 without change when the basis of the sifted key 10-1 for a value of '0' in the previously shared authentication key 30-1 is {0,1}.

Meanwhile, when authentication is applied, the first quantum cryptography communication authentication apparatus 100 inverts '1' in the result value 40-1 into '0' and reveals '0' when the basis of the sifted key 10-1 for a value of '1' in the previously shared authentication key 30-1 is {+,−}.

However, when authentication is not applied, the second quantum cryptography communication authentication apparatus 101 inverts '0' in a result value 40-2 into '1' and reveals '1' when the basis of the sifted key 10-2 for a value of '0' in the previously shared authentication key 30-2 is {0,1}.

Further, when authentication is not applied, the second quantum cryptography communication authentication apparatus 101 reveals '1' in the result value 40-2 without change if the basis of the sifted key 10-2 for a value of '1' in the previously shared authentication key 30-2 is {+,−}.

As a result, it can be seen that the revealed result stream of the first quantum cryptography communication authentication apparatus 100 is {0, 0, 0, 1, 0, . . . }, and that the revealed result stream of the second quantum cryptography communication authentication apparatus 101 is {1, 0, 1, 1, 0, . . . }, and thus the revealed result values are different from each other.

Therefore, the second quantum cryptography communication authentication apparatus 101 cannot be authenticated by the first quantum cryptography communication authentication apparatus 100.

Figure 6:
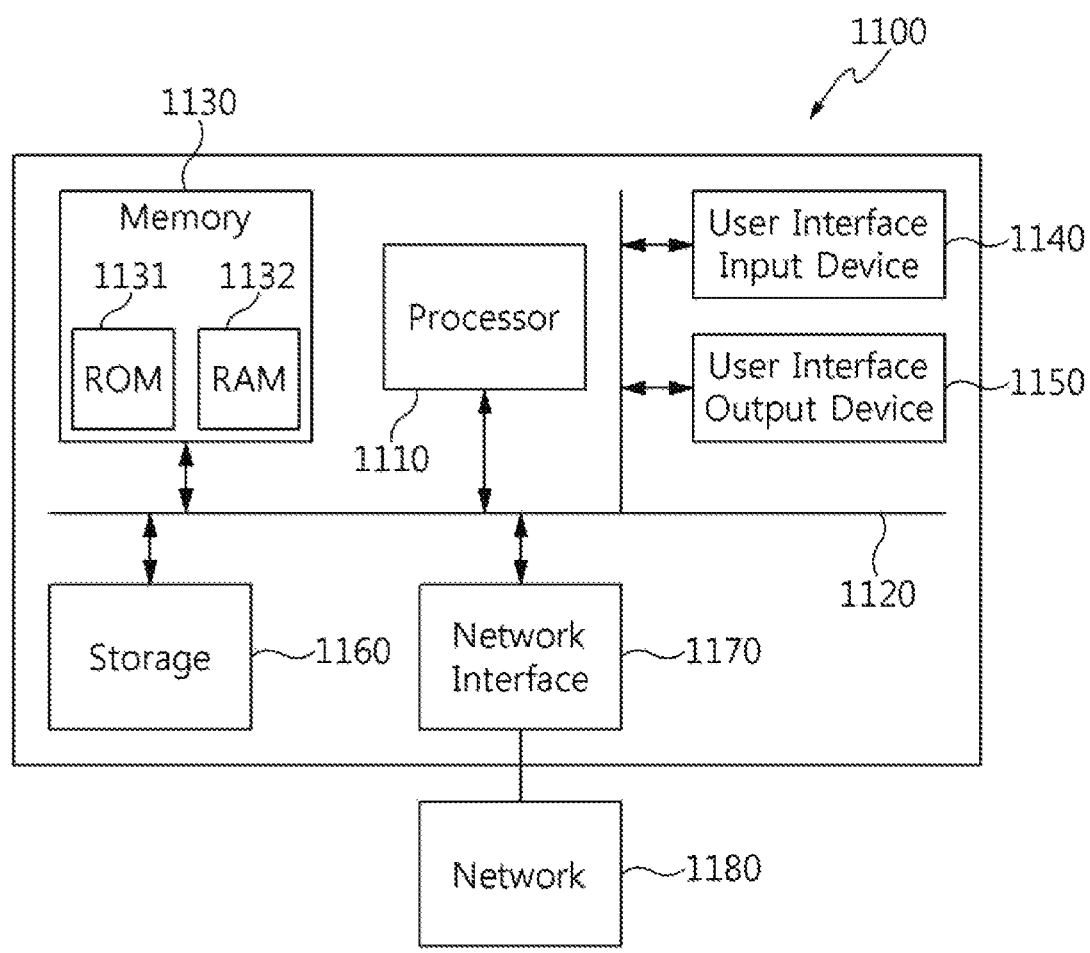
FIG. 6 is a block diagram illustrating a computer system according to an embodiment of the present invention.

FIG. 6 is a block diagram illustrating a computer system according to an embodiment of the present invention.

Referring to FIG. 6, the quantum cryptography communication authentication apparatus according to an embodiment of the present invention may be implemented in a computer system 1100 such as a computer-readable storage medium. As shown in FIG. 6, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

The quantum cryptography communication authentication apparatus and method according to the embodiments of the present invention may be summarized on the assumption that an attacker perfectly acquires all sifted keys through man-in-the-middle attacks and predicts an authentication key according to the completely random selection.

In the present invention, the attacker's prediction for the authentication key may succeed with a probability of 50%. The case of the remaining 50% with which the attacker fails in prediction may be divided into the case where the value '0' of the authentication key is predicted to be '1' and the case where the value '1' of the authentication key is predicted to be '0'.

For example, according to the present invention, even in the case where the value '0' of the authentication key is predicted to be '1', a measurement result only in the basis {+} of a normal authentication key must be inverted, but the selected basis {+} does not invert a measurement result in the basis {+} due to the value '1' of the erroneously predicted authentication key, thus causing an error.

In this case, the present invention inverts a measurement result in the basis {×} due to the value '1' of the erroneously predicted authentication key when the basis {×} is selected, thus causing an error.

That is, in the present invention, when the attacker fails in prediction, errors always occur in revealed result values.

Therefore, when authentication keys are randomly measured, the present invention cause errors in revealed result values of about 50%, whereby the authentication procedure fails.

Further, in the present invention, all processes of an existing quantum key distribution are almost equally applied, and thus entity authentication may be easily implemented using only the current technology.

Furthermore, the present invention may perform mutual authentication between communication entities before an error correction procedure, which requires the greatest number of computational resources and the largest amount of time, when an existing quantum key distribution protocol is actually operated.

Therefore, the present invention may reduce the waste of resources and time compared to conventional technology.

Also, the present invention may succeed in authentication while detecting eavesdropping even in the situation in which the basic assumption of quantum key distribution is partially broken, as in the case where man-in-the-middle (MID) attacks are made by attackers both on quantum channels and classical channels in existing quantum key distribution.

Further, when man-in-the-middle attacks are made both on quantum channels and classical channels in existing quantum key distribution, a conventional scheme progresses to privacy amplification in a postprocessing process, and thus information generated up to a step previous to the generation of some sifted keys and raw keys is exposed, with the result that a quantum state implementation scheme in the system may be partially exposed.

However, the present invention may prevent the exposure of unnecessary information because authentication is applied before the generation of sifted keys.

Further, the present invention may be applied regardless of the type of quantum key distribution protocol.

The present invention may also apply the present technique to various quantum cryptography communication protocols in which different bases are used, similarly to quantum key distribution, thus enabling authentication to be easily applied to quantum cryptography communication.

The present invention may authenticate a communication partner and guarantee continuous certification for an authenticated key stream in order to implement secure quantum cryptography communication.

The present invention may provide secure communication between legitimate users by integrating entity authentication with a quantum direct communication technique.

As described above, in the authentication apparatus and method for quantum cryptography communication according to the present invention, the configurations and schemes in the above-described embodiments are not limitedly applied, and some or all of the above embodiments can be selectively combined and configured such that various modifications are possible.

What is claimed is:

1. An authentication method for quantum cryptography communication, the authentication method being performed using quantum cryptography communication authentication apparatuses, the authentication method comprising:

transmitting, by a first quantum cryptography communication authentication apparatus, a quantum state to a second quantum cryptography communication authentication apparatus using a first basis selected by the first quantum cryptography communication authentication apparatus, and measuring, by the second quantum cryptography communication authentication apparatus, the quantum state a second basis selected by the second quantum cryptography communication authentication apparatus; and performing, by the first quantum cryptography communication authentication apparatus and the second quantum cryptography communication authentication apparatus, authentication by revealing the first basis and the second basis to each other and by comparing sifted keys with each other which are generated when the first basis and the second basis are matched to each other.

2. The authentication method of claim 1, further comprising generating quantum keys by correcting errors in the authenticated sifted keys and by amplifying privacy.

3. The authentication method of claim 1, wherein the performing authentication is configured such that the first quantum cryptography communication authentication apparatus and the second quantum cryptography communication authentication apparatus generate the sifted keys by selecting results obtained when the first basis and the second basis match.

4. The authentication method of claim 3, wherein the performing authentication is configured to generate the sifted keys, each including authentication bits corresponding to function classification values for authenticating the corresponding sifted key.

5. The authentication method of claim 4, wherein the performing authentication is configured to divide the function classification values of bits included in the sifted key into signal bits, Quantum Bit Error Rate (QBER) bits, and authentication bits.

6. The authentication method of claim 5, wherein the performing authentication is configured such that the first quantum cryptography communication authentication apparatus indicates a sequence of the function classification values for the signal bits, the QBER bits, and the authentication bits included in the sifted key, and then shares the sifted key with the second quantum cryptography communication authentication apparatus.

7. The authentication method of claim 6, wherein the performing authentication is configured to reveal the QBER bits without change and to invert and reveal result values for the authentication bits depending on a basis of values of the authentication bits.

8. The authentication method of claim 7, wherein the performing authentication is configured such that the first quantum cryptography communication authentication apparatus and the second quantum cryptography communication authentication apparatus perform authentication by comparing the QBER bits and the authentication bits shared therebetween.

9. The authentication method of claim 8, wherein the performing authentication is configured to compare the QBER bits without change and to invert and compare result values for the authentication bits depending on the basis of the values of the authentication bits.

10. The authentication method of claim 9, wherein the performing authentication is configured such that the first quantum cryptography communication authentication apparatus performs authentication by comparing result values for the authentication bits before being inverted with inverted values of result values for authentication bits revealed by the second quantum cryptography communication authentication apparatus.

11. An authentication apparatus for quantum cryptography communication, comprising:

a quantum state transmitter for, when a quantum state is transmitted, selecting a first basis and then transmitting the quantum state, and when a quantum state is received, selecting a second basis and then measuring the received quantum state; and a bit authentication logic unit for revealing one of the first basis and the second basis to another authentication apparatus for quantum cryptography communication, and performing authentication by comparing sifted keys with each other which are generated when the revealed basis and a third basis revealed by the other quantum cryptography communication authentication apparatus are matched to each other.

12. The authentication apparatus of claim 11, further comprising:

a postprocessing logic for correcting error in the authenticated sifted key; and a quantum key generation logic for generating a quantum key by amplifying privacy of the authenticated sifted key.

13. The authentication apparatus of claim 11, wherein the bit authentication logic generates the sifted key by selecting results obtained when the first basis and the second basis match.

14. The authentication apparatus of claim 13, wherein the bit authentication logic generates the sifted key including authentication bits corresponding to function classification values for authenticating the sifted key.

15. The authentication apparatus of claim 14, wherein the bit authentication logic divides the function classification values of bits included in the sifted key into signal bits, Quantum Bit Error Rate (QBER) bits, and authentication bits.

16. The authentication apparatus of claim 15, wherein the bit authentication logic indicates a sequence of the function classification values for the signal bits, the QBER bits, and the authentication bits included in the sifted key, and then shares the sifted key with the other quantum cryptography communication authentication apparatus.

17. The authentication apparatus of claim 16, wherein the bit authentication logic is configured to reveal the QBER bits without change and to invert and reveal result values for the authentication bits depending on a basis of values of the authentication bits.

18. The authentication apparatus of claim 17, wherein the bit authentication logic performs authentication by comparing the QBER bits and the authentication bits shared with the other quantum cryptography communication authentication apparatus.

19. The authentication apparatus of claim 18, wherein the bit authentication logic is configured to compare the QBER bits without change and to invert and compare result values for the authentication bits depending on the basis of the values of the authentication bits.

20. The authentication apparatus of claim 19, wherein the bit authentication logic performs authentication by comparing result values for the authentication bits, before being inverted, with inverted values of result values for authentication bits revealed by the other quantum cryptography communication authentication apparatus.

* * * * *